United States Patent [19]

Rody et al.

[11] 3,998,804
[45] Dec. 21, 1976

[54] PROCESS FOR COUPLING OF WATER-INSOLUBLE 2,4-DISUBSTITUTED PHENOLS WITH DIAZOTIZED O-NITROANILINES

[75] Inventors: Jean Rody, Basel; Alain Claude Rochat, Birsfelden; Hans Jakob Peterli, Fullinsdorf; Robert Albrecht, Riehen, all of Switzerland

[73] Assignee: Ciba-Geigy Corporation, Ardsley, N.Y.

[22] Filed: May 6, 1975

[21] Appl. No.: 575,118

Related U.S. Application Data

[63] Continuation-in-part of Ser. No. 375,201, June 29, 1973, abandoned.

[30] Foreign Application Priority Data

July 11, 1972 Switzerland .................... 10357/72

[52] U.S. Cl. .............................. 260/206; 260/207
[51] Int. Cl.$^2$ ...................................... C09B 29/12
[58] Field of Search ........................... 260/206, 207

[56] References Cited

FOREIGN PATENTS OR APPLICATIONS

| 761,639 | 3/1934 | France | 260/206 |
| 360,357 | 12/1972 | U.S.S.R. | 260/197 |

OTHER PUBLICATIONS

Fierz–David et al., *Fundamental Processes of Dye Chemistry*, Interscience Publishers, Inc.; New York, 1949, pp. 239–241 and 252–254.
Zollinger, *Helv. Chim. Acta.*, 36, 1070 (1953).
Allan, *Coll. Czech. Chem. Com.*, 16–17, 620 (1952).

*Primary Examiner*—Charles F. Warren
*Attorney, Agent, or Firm*—Luther A. R. Hall

[57] ABSTRACT

Substituted 2-nitro-2'-hydroxy-azobenzenes are manufactured by coupling a phenol dispersed with a dispersing agent in water with a solution, in an inorganic acid, of a diazotized o-nitroaniline at a pH value not exceeding 2.

The azobenzenes obtained are intermediate products for benztriazoles.

3 Claims, No Drawings

PROCESS FOR COUPLING OF WATER-INSOLUBLE 2,4-DISUBSTITUTED PHENOLS WITH DIAZOTIZED O-NITROANILINES

CROSS-REFERENCE TO RELATED APPLICATION

This is a continuation-in-part application of our co-pending application Ser. No. 375,201, filed June 29, 1973, now abandoned.

The present invention relates to an improved process for the manufacture of azo compounds by coupling of a diazotised o-nitroaniline and a water-insoluble 2,4-disubstituted phenol.

Due to the very low solubility of 2,4-disubstituted phenols in water and in aqueous inoragnic bases of pH 8 to 11, the coupling of such compounds could hitherto only be carried out in the presence of water-miscible organic solvents, such as alcohols, and very dilute solutions were used so as to make it possible to achieve the relative phenolate concentration required for the coupling to progress rapidly. Under such conditions, impure products were produced in relatively poor yields.

This state of the art is shown by French Pat. No. 761,639 of Dreyfus, disclosing coupling in non-acidic medium. U.S.S.R. Pat. No. 360,357 of Zakoshchikov et al. discloses, that prior to coupling the sodium salt of a phenol is prepared and that the so obtained alkaline solution of the phenol azo component is used.

Fierz-David et al., "Fundamental Processes of Dye Chemistry", Interscience Publishers Inc., New York 1949, 239–241 and 252–254 concerns the coupling of 2,4-dinitrodiazobenzene. This is a compound soluble in water but unstable in alkali and at elevated temperatures and its coupling had therefore to be performed in acidic solution at low temperatures, accepting decomposition by-products, such as biaryls.

Coupling in acidic medium is also disclosed by Z. J. Allan, Coll. Czech. Chem. Com. 16–17, 620(1952) and H. Zollinger, Helv. Chim. Acta 36, 1070(1953). Both say, that optimal coupling of phenols with diazonium salts is done in alkaline media, although anomalous results occur in quite concentrated sulfuric acid, and refer specifically to 2,4-dinitrobenzene diazonium sulphate, again an unstable but water soluble compound.

Thus, from the state of the art one had to take that in cases where coupling under optimal (alkaline) conditions is not possible for some reason, coupling in acidic solution is possible, leading to considerable amounts of by-products.

It has been found, that coupling of water-insoluble 2,4-disubstituted phenols is possible in water dispersion at a pH value below 2. Knowing the state of the art one would assume that considerable amounts of biaryls are formed as by-products, since coupling of diazotised anilines with phenols in such acid medium preferably lead to biaryls. It was surprising to find that the formation of such by-products is definitely avoided in the instant process.

In addition to the advantages of good yields and high concentration of diazo component and coupling component in the reaction mixture, the new improved process also has the advantage that it operates without organic solvents and without buffer mixtures. This not only makes the process more economical, but also reduces the danger of pollution of the environment.

According to the new improved process for the manufacture of compounds of the formula I

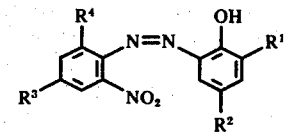

in which $R^1$ and $R^2$ independently of one another denote alkyl, cycloalkyl, aralkyl or chlorine, $R^3$ denotes hydrogen, chlorine, alkyl, alkoxy, alkylsulphonyl, acylamino, $-SO_3H$ or $-COOH$ and $R^4$ denotes hydrogen or chlorine, in an aqueous inorganic acid medium at a pH value less than 2 and at a temperature between 0° and 60° C by the addition of an aqueous acid solution of a diazonium salt of an amine of the formula II

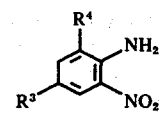

to an aqueous dispersion of a phenol of the formula III

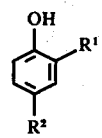

wherein the improvement consists essentially of using an aqueous dispersion of the water-insoluble phenol of formula III prepared by adding the free phenol with vigorous stirring to an aqueous solution of an effective amount of an alkyl sulfonate, alkylaryl sulfonate, benzene sulfonate or naphthalene sulfonate dispersing agent.

Preferably, compounds of the formula I are manufactured, in which $R^1$ and $R^2$ independently of one another denote alkyl with 1 to 8 carbon atoms, cycloalkyl with 6 to 8 carbon atoms, aralkyl with 7 to 9 carbon atoms or chlorine, $R^3$ denotes hydrogen, chlorine, alkyl with 1 to 4 carbon atoms, alkoxy with 1–4 carbon atoms, ethylsulphonyl, acetamino, $-SO_3H$ or $-COOH$ and $R^4$ denotes hydrogen or chlorine.

According to the definition, $R^1$, $R^2$ and $R^3$ can be alkyl groups. These can be methyl, ethyl, n-propyl, iso-propyl, n-butyl, sec.-butyl, tert.-butyl, n-amyl, tert.-amyl, n-hexyl or tert.-octyl. The groups $R^1$ and $R^2$ also denote aralkyl, such as benzyl, α-methylbenzyl or α,α-dimethylbenzyl or denote cycloalkyl, such as cyclohexyl or cyclooctyl.

In the process according to the invention, the phenols of the formula III are employed as dispersions in water. The term dispersion is used in the present invention to describe any fine distribution of the phenol, regardless of whether the phenol is liquid or solid. Dispersions are produced, for example, by adding dispersing agents to the phenol, preferably to the liquid phenol. It is frequently necessary to stir particularly rapidly at the same time. However, it is not necessary for all the phenol to be present as a dispersion at the beginning of the reaction in the process according to the invention. It is entirely possible for a part of the pheno to be in a phase which is separate from the water but is in contact with the water and only to change to the form dispersed in water progressively during the reaction. Hence it suffices in the case of some phenols, for a dispersing agent to be present at the beginning of the reaction. In the present application, the term "dispersed phenols" therefore also includes phenols which are in part in a phase which is separate from the water but is in contact with the water and are only in part dispersely distributed in water. Emulsions, that is to say a finely divided form of liquid phenol in water, are preferably used in the process according to the invention.

The temperatures in the process according to the invention are preferably 20° to 40° C.

The pH value of the reaction mixture should always be less than 2. If an amount of the inorganic acid which suffices to maintain this pH is already introduced before the beginning of the reaction, it is not necessary thereafter to check the pH. However, if the reaction is only carried out with minimum amounts of the inorganic acid, the pH must be continuously checked during the reaction and be kept, if necessary, to a value less than 2 by adding further inorganic acid.

Preferred dispersing agents are those which produce a stabilisation of the diazonium salt through forming a "complex" (see S. Koller and H. Zollinger, Helvetica Chimica Acta, Vol. 53, pages 78–89 (1970). These are, above all, aromatic compounds containing sulpho groups, of the alkylsulphonate and alkylarylsulphonate categories, such as alkylbenzenesulphonates or alkylnaphthalenesulphonates. The following sulphonates (in the form of alkali metal salts or alkaline earth metal salts) should be mentioned as concrete examples: Benzenesulphonate, 1-naphthalenesulphonate, 2-naphthalenesulphonate, 1-tetralinsulphonate, 2-tetralinsulphonate, 1-naphthylmethanesulphonate, 2-naphthol-1-sulphonate, 1,5-naphthalenedisulphonate, 2-naphthol-6,8-disulphonate, 2-naphtholtrisulphonates or mixtures thereof.

The coupling is carried out in a solution containing an inorganic acid. Possible inorganic acids are, for example, hydrochloric acid and sulphuric acid.

In the process according to the invention, the dispersion of the compound of the formula III can be added to the solution of the diazonium salt of the compound of the formula II.

Preferably, however, a solution of the diazonium salt of the compound of the formula II is added to a dispersion of the compound of the formula III. The solutions of the diazonium salts of the o-nitroanilines of the formula II are prepared in the manner known to those skilled in the art.

In the process according to the invention, the diazonium salts of, for example, the following o-nitroanilines may be employed: 2-Nitroaniline, 2-nitro-4-chloroaniline, 2-nitro-4-methylaniline, 2-nitro-4-n-butylaniline, 2-nitro-4-tert.-butylaniline, 2-nitro-4-methoxyaniline, 2-nitro-4,6-dichloroaniline, 2-nitro-4-ethylsulphonylaniline, 2-nitro-4-acetylaminoaniline, and 3-nitro-4-aminobenzenesulphonic acid.

In the process according to the invention the following phenols, for example, may be employed: 2,4-Dimethylphenol, 2,4-di-isopropylphenol, 2,4-di-tert.-butylphenol, 2,4-di-sec.-butylphenol, 2,4-di-tert.-amylphenol, 2,4-bis-α-phenylethylphenol, 2,4-dicyclohexylphenol, 2,4-dibenzylphenol, 2-methyl-4-tert.-butylphenol, 2-tert.-butyl-4-methylphenol, 2-methyl-4-tert.-amylphenol, 2-tert.-amyl-4-methylphenol, 2-methyl-4-sec.-butylphenol, 2-sec.-butyl-4-methylphenol, 2-sec.-butyl-4-tert.-butylphenol, 2-tert.-butyl-4-sec.-butylphenol, 2-methyl-4-α-phenylethylphenol, 2-α-phenylethyl-4-methylphenol, 2-α-phenylethyl-4-chlorophenol, 2-chloro-4-methylphenol, 2-methyl-4-chlorophenol, 2-chloro-4-sec.-butylphenol, 2-sec.-butyl-4-chlorophenol, 2-tert.amyl-4-sec.-butylphenol, 2-cyclohexyl-4-methylphenol, 2-cyclooctyl-4-methylphenol, 2-cyclohexyl-4-sec.-butylphenol, 2-cyclooctyl-4-sec.-butylphenol, 2-α-phenylethyl-4-sec.-butylphenol, 2-tert.-butyl-4-isopropylphenol, 2-tert.-amyl-4-isopropylphenol, 2-cyclohexyl-4-isopropylphenol, 2-chloro-4-tert.-amylphenol, 2-chloro-4-tert.-octylphenol, 2-sec.-butyl-4-tert.-amylphenol, 2-tert.-amyl-4-sec.-butylphenol, 2-benzyl-4-methylphenol, 2-methyl-4-benzylphenol, 2-tert.-octyl-4-methylphenol, 2-α,α-dimethylbenzyl-4-methylphenol, 2-methyl-4-α,α-dimethylbenzylphenol, 2-sec.-butyl-4-tert.-octylphenol and 2-tert.-octyl-4-sec.-butylphenol.

The 2-nitroanilines of the formula II used as starting products may be manufactured according to known methods. For example, the corresponding 2-chloronitrobenzenes can be reacted with ammonia to give the desired amines. Another possible method of manufacture is the o-nitration of acylated anilines, with subsequent saponification of the amide group.

The phenols of the formula III which can be used as starting products can also be manufactured according to known methods. For example, phenol can be dialkylated in the 2- and 4-position with olefines in the presence of acid catalysts. Another possible synthesis starts from 2- or 4-alkylphenols which can also be alkylated or chlorinated in the 4- or 2-position, respectively, according to known methods.

The compounds of the formula I are intermediate products for benztriazoles which are used as light protection agents as described, for example, in Belgian Pat. No. 563,210.

The examples which follow illustrate the invention. Percentages (%) are percentages by weight, unless expressly described otherwise.

PROCESS I

Example I = Coupling of o-nitroaniline with 2,4-di-tert.butylphenol

Diazotisation: 130 g of o-nitroaniline are slowly added to a mixture of 130 g of ice and 264 g of sulphuric acid (92–94% strength) whilst keeping the temperature at between 50° and 60° C. As soon as a solution has been produced, a total of a further 280 g of ice is added in portions, in the course of which the temperature drops to about 10° C and the amine precipitates in a fine form. The mixture is then cooled further to 0°–3° C and whilst maintaining this temperature a 50% strength by volume solution of approx. 67.6 g of sodium nitrite is allowed to run in over the course of 1 to 3 hours and the reaction is allowed to go to completion over the course of 2–4 hours, whereby a yellow solution is produced. At the end of the diazotisation, a slight excess of nitrite should be detectable, otherwise further amounts of sodium nitrite must be added. Shortly before the beginning of the coupling reaction, this excess is destroyed with sulphamic acid.

Coupling: First, 94 g of technical naphthalenesulphonic acid (isomer mixture, approx. 85% pure) are dissolved in 80 g of water at 60° C. 9.5 g of alkylaryl polyglycol ether with alkylarylsulphonates (grade Emullat P 140 HFP of Messrs. Union Chimique Belge) and 191 g of fused 2,4-di-tert.butylphenol are added thereto, with vigorous stirring and the suspension is stirred for one hour until a homogeneous emulsion is formed. It is then cooled to 40° C and the cold (0°–5° C) prepared diazo solution is allowed to run in over the course of 2–3 hours. During the addition, the reaction temperature is kept at 40°–45° C by means of a bath. After completion of the addition, the mixture is stirred for 6 to 10 hours at 40°–43° C until the diazo compound has been completely consumed, and is then filtered on a suction filter, and the coarsely crystalline product is washed with approx. 1.6 liters of warm water. After drying in vacuo at 70°–75° C, 340 g of 90% pure product are obtained, corresponding to a yield of 93% of theory relative to phenol employed. Melting point 151° C.

If instead of 2,4-di-tert.butylphenol an equivalent amount of 2-chloro-4-methylphenol, 2,4-dimethylphenol, 2-sec.-butyl-4-chlorophenol, 2-sec.-butyl-4-tert.-butylphenol or 2-tert. butyl-4-sec.-butylphenol is used and in other respects the procedure described is followed, the following azo compounds are obtained: 2-Nitro-2′-hydroxy-3′-chloro-5′-methylazobenzene, melting point 154° C. 2-Nitro-2′-hydroxy-3′,5′-dimethylazobenzene, melting point 142° C, 2-nitro-2′-hydroxy-3′-sec.-butyl-5′-chloroazobenzene, melting point 80° C, 2-nitro-2′-hydroxy-3′-sec.-butyl-5′-tert.-butylazobenzene, melting point 94° C and 2-nitro-2′-hydroxy-3′-tert.-butyl-5′-sec.-butylazobenzene, melting point 104° C.

Example II = Coupling of o-nitroaniline with 2,4-ditert.-amylphenol

Diazotisation: 215 g of 60% strength o-nitroaniline containing water are added to 34 g of water and 30 g of ice and the mixture is stirred very vigorously for 30 minutes. The resulting suspension is then allowed to run into a solution of 300 g of hydrochloric acid (30% strength) and 120 g of ice. A 50% strength by volume solution of approx. 64.8 g of sodium nitrite is added thereto over the course of 3 hours and the temperature is kept at between 0° and 5° C by external cooling. The reaction mixture is allowed to complete reacting over the course of 2–4 hours, whereby a yellow solution is produced. At the end of the diazotisation, a slight excess of nitrite should be detectable, otherwise further amounts of sodium nitrite must be added. Shortly before the beginning of the coupling, this excess is destroyed with sulphamic acid.

Coupling: First, 85 g of technical naphthalenesulphonic acid (isomer mixture, approx. 85% pure) are dissolved in 82 g of water at 60° C. 8.6 g of akylaryl polygylcol ether with alkylarylsulphonates (grade Emullat P 140 HFP of Messrs. Union Chimique Belge) and 206 g of fused 2,4-di-tert.-amylphenol are added thereto, with vigorous stirring, and the suspension is stirred for one hour until a homogeneous emulsion has formed. It is then cooled to 35° C and the cold (0°–5° C) prepared diazo solution is allowed to run in over the course of 4–5 hours. During the addition, the reaction temperature is kept at 36°–38° C by means of a bath. After completion of the addition, the mixture is stirred for 3–10 hours at 40°–45° C until the diazo compound has been completely consumed and the product is then filtered off on a suction filter and washed with approx. 1.6 liters of warm water. After drying in vacuo at 70° C, 334 g of 90% pure product are obtained, corresponding to a yield of 89% of theory, relative to phenol employed. Melting point 125° C.

If instead of 2,4-di-tert.amylphenol and equivalent amount of 2-α-phenylethyl-4-chlorophenol, 2-cyclohexyl-4-methylphenol, 2-cyclohexyl-4-chlorophenol, 2-chloro-4-tert.-octylphenol or 2-α-phenylethyl-4-methylphenol is used and in other respects the procedure described above is followed, the following azo compounds are obtained: 2-Nitro-2′-hydroxy-3′-α-phenylethyl-5′-chloroazobenzene, melting point 124° C 2-nitro-2′-hydroxy-3′-cyclohexyl-5′-methylazobenzene, melting point 88° C, 2-nitro-2′-hydroxy-3′-cyclohexyl-5′-chloroazobenzene, melting point 96° C, 2-nitro-2′-hydroxy-3′-chloro-5′-tert.-octylazobenzene, melting point 137° C and 2-nitro-2′-hydroxy-3′-α-phenylethyl-5′-methylazobenzene, melting point 123° C.

Example III = Coupling of P-chloro-o-nitroaniline with 2-tert.butyl-p-cresol

Diazotisation: 241 g of 70% pure p-chloro-o-nitroaniline containing water are introduced, whilst cooling, into 293 g of sulphuric acid (92–94% strength). The temperature is allowed to rise to about 82° C, in the course of which a solution is produced. A total of 514 g of ice is then added in portions and the resulting suspension is stirred for 30 minutes and cooled to 0° C, and whilst maintaining this temperature a 50% strength by volume solution of 70 g of sodium nitrite is added over the course of 2–3 hours. The mixture is allowed to complete reacting over the course of a further 2–4 hours and checks are made to ensure that a slight excess of nitrite is always present. The resulting yellow diazo solution is stored at 0°–5° C. Shortly before the beginning of the coupling, the excess nitrite is destroyed with sulphamic acid.

Coupling: 98 g of naphthalenesulphonic acid (technical isomer mixture, approx. 85% pure) are dissolved in 84 g of water at 60° C. 9.8 g of alkylaryl polyglycol ether with alkylarylsulphonates (grade Emullat P 140 HFP of Messrs. Union Chimique Belge) and 157.5 g of fused 2-tert.-butyl-p-cresol are added thereto, with vigorous stirring, and the suspension is stirred for 2 hours at 60° C, until a homogeneous emulsion has formed. The emulsion is then cooled to 40° C, the cold prepared diazo solution is allowed to run in over the course of 2–3 hours, and during the addition the reaction temperature is kept at 40°–45° C by means of a bath. After completion of the addition, the mixture is stirred for 1 hour at 45° C and then heated to 60° C and kept at this temperature until the diazonium salt has been completely consumed. Thereafter the product is filtered off on a suction filter and washed with approx. 2 liters of warm water. After drying in vacuo at 80° C, 300 g of 90% pure product are obtained, corresponding to a yield of approx. 81% of theory relative to phenol employed. Melting point 172° C.

If instead of 2-tert.-butyl-p-cresol an equivalent amount of 2-α-phenylethyl-4-methylphenol, 2-chloro-4-methylphenol, 2,4-di-tert.-amylphenol, 2-chloro-4-tert.-octylphenol or 2-sec.-butyl-4-tert.-butylphenol is used and in other respects the procedure described above is adopted, the following azo compounds are obtained: 2-Nitro-4-chloro-2′-hydroxy-3′-α-phenylethyl-5′-methyl-azobenzene, melting point 154° C, 2-nitro-4-chloro-2′-hydroxy-3′-chloro-5′-methylazobenzene, melting point 168° C, 2-nitro-4-chloro-2′-hydroxy-3′,5′-di-tert.amylazobenzene, melting point 114° C, 2-nitro-4-chloro-2′-hydroxy-3′-chloro-5′-tert-.octylazo-benzene, melting point 144° C and 2-nitro-4- chloro-2'-hydroxy-3'-sec.-butyl-5'-tert.butyl-azobenzene, melting point 125°–126° C.

Example IV = Coupling of p-chloro-o-nitroaniline with di-tert.butylphenol

Diazotisation: 220 g of 70% pure p-chloro-o-nitroaniline, containing water, are introduced into 264 g of sulphuric acid (92–94% strength) whilst cooling. The temperature is allowed to rise to 82° C, whereby a solution is produced. A total of 453 g of ice is then added in portions, the resulting suspension is stirred for 30 minutes and cooled to 0° C, and whilst maintaining this temperature a 50% strength by volume solution of 64 g of sodium nitrite is added over the course of 2 to 3 hours. The mixture is allowed to complete reacting over the course of a further 2–4 hours and checks are made to ensure that a slight excess of nitrite is present. The resulting yellow diazo solution is stored at 0°–5° C. Shortly before the beginning of coupling, the excess nitrite is destroyed with sulphamic acid.

Coupling: 90 g of naphthalenesulphonic acid (technical isomer mixture, approx. 85% pure) are dissolved in 156 g of water at 60° C. 9 g of alkylaryl polyglycol ether with alkylaryl sulphonates (type Emullat P 140 HFP of Messrs. Union Chimique Belge) and 183.7 g of fused 2,4-di-tert.-butylphenol are added thereto, with vigorous stirring, and the suspension is stirred at 60° C for about 2 hours until a homogeneous emulsion has formed. The emulsion is then cooled to 40° C, the cold prepared diazo solution is allowed to run in over the course of 1 to 2 hours and during the addition the reaction temperature is kept at 40°–45° C by means of a bath. After completion of the addition, the mixture is stirred for 2–4 hours at 35°–40° C until the diazonium salt has been completely consumed. Thereafter the product is filtered off and washed with approx. 2 liters of warm water. After drying in vacuo at approx. 80° C, 333 g of 90% pure product are obtained, corresponding to a yield of about 86.5% of theory relative to phenol employed. Melting point 212° C.

If instead of p-chloro-o-nitroaniline and 2,4-di-tert.-butylphenol the starting products indicated in each case below are used, and in other respects the procedure described above is adopted, the following azo compounds are obtained:

From 3-nitro-4-aminobenzenesulphonic acid and 2,4-dimethylphenol: 2-Nitro-4-sulpho-2'-hydroxy-3',5'-dimethylazobenzene; from 3-nitro-4-aminobenzenesulphonic acid and 2,4-di-tert.-butylphenol: 2-Nitro-4-sulpho-2'-hydroxy-3',5'-di-tert. butylazobenzene; from 2-nitro-4-methoxyaniline and 2,4-di-tert.-butyl-phenol: 2-Nitro-4-methoxy-2'-hydroxy-3',5'-di-tert.-butylazobenzene, melting point 160° C; from 2-nitro-4-methoxyaniline and 2-sec.-butyl-4-tert.-butylphenol: 2-Nitro-4-methoxy 2'-hydroxy-3'-sec.-butyl-5'-tert.-butylazobenzene, melting point 98° C.

We claim:

1. An improved process for the manufacture of a compound of the formula

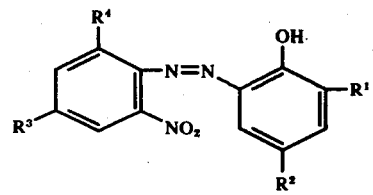

in which $R^1$ and $R^2$ independently of one another denote alkyl, cycloalkyl, aralkyl or chlorine, $R^3$ denotes hydrogen, chlorine, alkyl, alkoxy, alkylsulphonyl, acylamino, —$SO_3H$ or —COOH, and $R^4$ denotes hydrogen or chlorine, in an aqueous inorganic acid medium at a pH value less than 2 and at a temperature between 0° and 60° C, by the addition of an aqueous acid solution of a diazonium salt of an amine of the formula

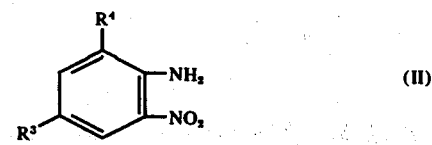

to an aqueous dispersion of a phenol of the formula

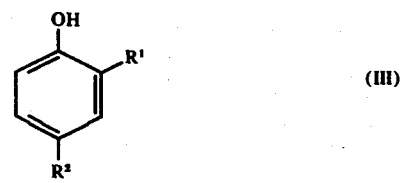

wherein the improvement consists essentially of
using an aqueous dispersion of the water-insoluble phenol of formula III prepared by adding the free phenol with vigorous stirring to an aqueous solution of an effective amount of an alkyl sulfonate, alkylaryl sulfonate, benzene sulfonate or naphthalene sulfonate dispersing agent.

2. The process according to claim 1 wherein
$R^1$ and $R^2$ indepedently of one another denote alkyl with 1 to 8 carbon atoms, cycloalkyl with 6 to 8 carbon atoms, aralkyl with 7 to 9 carbon atoms or chlorine
$R_3$ denotes hydrogen, chlorine, alkyl with 1 to 4 carbon atoms, alkoxy with 1 to 4 carbon atoms, ethylsulphonyl, acetamino, —$SO_3H$ or —COOH, and $R^4$ denotes hydrogen or chlorine.

3. The process according to claim 1 wherein the reaction is carried out at a temperature between 20° and 40° C.

* * * * *